United States Patent [19]

Suzuki et al.

[11] Patent Number: 5,026,153
[45] Date of Patent: Jun. 25, 1991

[54] VEHICLE TRACKING CONTROL FOR CONTINUOUSLY DETECTING THE DISTANCE AND DIRECTION TO A PRECEDING VEHICLE IRRESPECTIVE OF BACKGROUND DARK/LIGHT DISTRIBUTION

[75] Inventors: Hiroyoshi Suzuki; Kenji Ogawa; Hiroko Maekawa; Seiya Kominami; Yoshiaki Asayama, all of Hyogo, Japan

[73] Assignee: Mitsubishi Denki K.K., Tokyo, Japan

[21] Appl. No.: 480,983

[22] Filed: Feb. 16, 1990

[30] Foreign Application Priority Data

| Mar. 1, 1989 | [JP] | Japan | 1-49307 |
| Mar. 6, 1989 | [JP] | Japan | 1-54402 |
| Mar. 24, 1989 | [JP] | Japan | 1-72615 |
| Mar. 27, 1989 | [JP] | Japan | 1-75727 |

[51] Int. Cl.$^5$ .......................... G01C 3/08; G08G 1/16
[52] U.S. Cl. ........................................ 356/1; 356/4; 356/152; 180/167; 340/903
[58] Field of Search .................. 356/1, 4, 141, 152; 180/167; 364/424.01, 426.01; 340/903

[56] References Cited

U.S. PATENT DOCUMENTS

| 4,257,703 | 3/1981 | Goodrich | 356/4 |
| 4,632,543 | 12/1986 | Endo | 356/5 |
| 4,652,917 | 3/1987 | Miller | 356/152 X |
| 4,895,440 | 1/1990 | Cain et al. | 356/5 |

FOREIGN PATENT DOCUMENTS

| 43328 | 4/1974 | Japan. |
| 120212 | 5/1988 | Japan. |

*Primary Examiner*—Linda J. Wallace
*Attorney, Agent, or Firm*—Sughrue, Mion, Zinn, Macpeak & Seas

[57] ABSTRACT

In an automobile radar apparatus according to the present invention, a light-receiving optical system is rotated in response to an output from an image formation position calculation unit in such a manner that light source is focused on a vertical plane containing an optical axis of the light-receiving optical system; a direction up to the preceding vehicle is calculated from a turning angle in response to an output derived from an angular detecting unit; and a distance up to the preceding vehicle is calculated from an image position of the light source based upon an output derived from the image formation calculation unit.

11 Claims, 14 Drawing Sheets

FIG. 1 (a) PRIOR ART
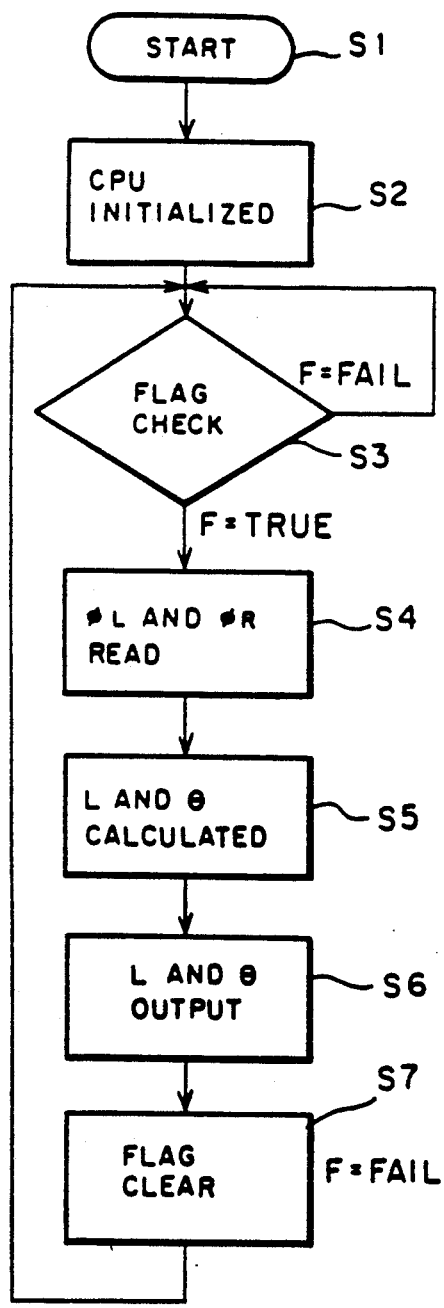
FIG. 1 (b) PRIOR ART
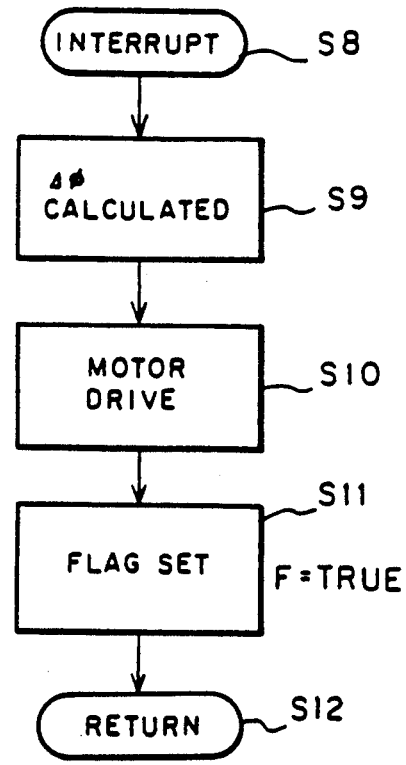

$$\Delta\phi = \tan^{-1}\left(\frac{\Delta P}{F}\right)$$

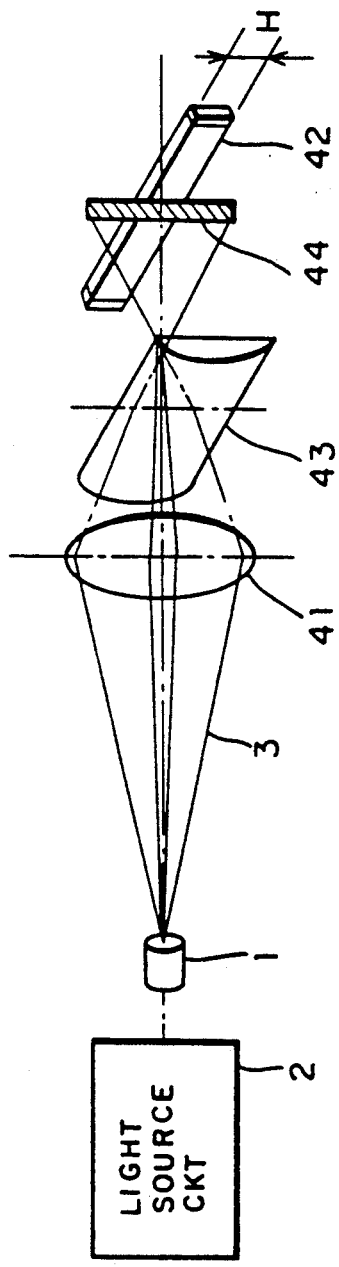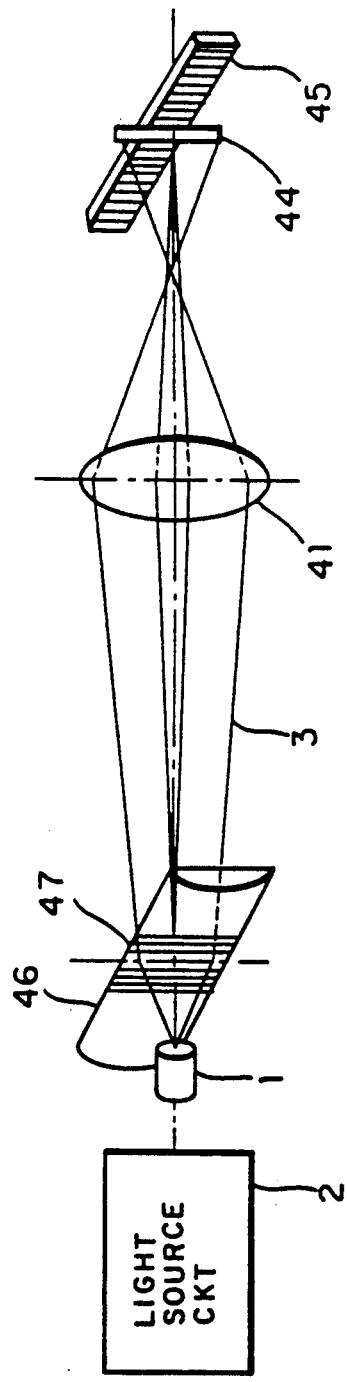

VEHICLE TRACKING CONTROL FOR CONTINUOUSLY DETECTING THE DISTANCE AND DIRECTION TO A PRECEDING VEHICLE IRRESPECTIVE OF BACKGROUND DARK/LIGHT DISTRIBUTION

BACKGROUND OF THE INVENTION

1. Field of the Invention

The present invention generally relates to a radar apparatus for an automobile. More specifically, the present invention is directed to an automobile radar apparatus suitable for performing automatic vehicle tracking control to automatically hold a predetermined safety distance between successive driving vehicles by detecting both a distance and a direction to the preceding vehicle.

2. Description of the Prior Art

Since the number of automobiles is considerably increased, frequent occurrence of traffic jams on roads have also increased. In particular, such traffic jams very usually occur on the general-purpose roads and highways in large cities and towns around large cities. Consequently, stress to drivers who drive on such roads crowded with automobiles has also considerably increased. Such stress leads to an increased occurrence frequencies of traffic accidents due to hampered judgement caused by driver's wearing. To mechanically and electronically avoid automobile such as these collisions various types of safety apparatus are required such as an automatic inter-vehicle distance maintaining apparatus, a inter-vehicle distance alarm apparatus, and an automatic braking apparatus. Furthermore, developments in automatic preceding-vehicle tracking apparatus can considerably reduce such stress on drivers. To effectively achieve the functions of these apparatus, an automobile radar apparatus capable of sensing a direction toward and a distance between a preceding vehicle and a self-vehicle, is necessarily required.

Conventionally, as a method for detecting the distance between a preceding vehicle and a self-vehicle, several systems are well known. That is to say, a distance is measured by calculating a transmission time for either electromagnetic waves, or optical pulses projected to the preceding vehicle. However, such a conventional vehicle-distance detecting system cannot be relied upon always to detect a correct distance because when the average vehicle distances are relatively short, as in the case of the above-described traffic jam, the transmission time becomes too short for accurate measurement. As another alternative distance detecting system for such a short distance, a range finder apparatus used for an automatic focusing operation of a camera can be used. As to such a range finder apparatus, a triangulation system is typically employed by way of either a passive method for utilizing incoming light, or an active method for emitting light from the distance measuring apparatus per se. Either passive method or active method can detect a distance, but can not detect a direction.

One conventional automobile radar apparatus has been proposed in, for instance, Japanese Laid-open patent application No. 63-120212, which utilizes the above-described triangulation system so as to detect both a distance and a direction to a preceding vehicle. More specifically, this radar apparatus detects heat emitted from an exhaust tube of the preceding vehicle. Unfortunately, this thermal detecting system cannot be applied to all vehicles, e.g., a motor truck equipped with an exhaust tube that is not at a rear side thereof, or a vehicle equipped with a plurality of exhaust tubes. Furthermore, such a system has the serious drawback that it is rather difficult to specify a heat source under high temperature conditions in summer even if a vehicle is equipped with a single exhaust tube at a rear side thereof. In addition, there are problems that the response characteristic of the detecting element for detecting such a low-temperature heat source is not so acceptable, and the element must be cooled. As a consequence, the radar apparatus becomes complex and expensive in cost.

To the contrary, another system has been opened in, for example, Japanese Laid-open patent application No. 49-43328, in which a light source is employed at a rear side of a preceding vehicle so as to project light rays therefrom toward a rear direction, and both a distance and a direction of the self-vehicle from a preceding vehicle are obtained by calculating a difference in the amount of light from a plurality of light receivers. Since distance and direction are calculated based upon the difference in the received light amounts of plural light receivers in the above-described conventional system, changes in the due to soiled light source and soiled light receivers, changes in the light emitting amounts of the light source due to temperature variations and aging, and also changes in the respective amounts of light received due to sensitivity changes of each of the respective light receivers, cannot be ignored. Moreover, since these changes in the received amounts of light are different from each other, there are other drawbacks to stable detecting operations of the distance and direction over a long time range.

FIG. 13 represents an arrangement of an automobile radar apparatus, in which a light emitting device is provided on a preceding vehicle, a self-vehicle is equipped with a rotatable optical system and a distance to from the self-vehicle preceding vehicle and the is detected.

It should be noted that this FIG. 13 corresponds to a block diagram for representing a fourth preferred embodiment of the present invention as will be discussed later. Nevertheless, reference is now made to FIG. 13 for showing a vehicle mounted radar device of the present invention in which a light emitting unit is mounted a preceding vehicle and an inter-vehicle distance is detected by a rotatable optical system on a self-vehicle constructed as shown in FIG. 13. In order to clarify the item to be targeted in reference to the second object, the present invention will be described in reference to FIGS. 13, 1 and 2, respectively.

In FIG. 13, reference numeral 1 denotes a light source which is installed at a predetermined position of a rear side (part) of a preceding vehicle 100. The light source 1 emits light in a blocking mode by way of a light source circuit 2.

Reference numeral 4 indicates a rotatable light-receiving optical system. A pair of the rotatable light-receiving optical systems are provided on a front side of a self-vehicle 200 in such a manner that two optical systems are separated from each other by a base length "B". These light-receiving optical systems 4 are separately driven by rotating (pivoting) means 10L and 10R. These rotating means 10L and 10R are under the control of rotation control means 9L and 9R, respectively.

In the respective light-receiving optical systems 4, there are provided light position detectors 42L and 42R. These light position detectors 42L and 42R are positioned in such a manner that the light emitted from the light source 1 is focused onto a light receiving plane of the respective detectors via light-receiving lens 41L and 41R.

Signals derived from the light position detectors 42L and 42R are processed by optical position process means 6L and 6R, respectively, so as to output a light position signal representative of an incident position of light, and a light receiving signal indicating that intermittent light is incident.

When the outputs from the light position process means 6L and 6R are supplied, an optical system rotation control means 21 outputs a signal to the rotation control means 9L and 9R so as to drive the rotation means 10L and 10R, whereby the rotation of the light-receiving optical system 4 is controlled.

Turning angle detecting sensors 11L and 11R detect an angle defined by a wheel shaft of the self-vehicle 200 and an optical axis of the light-receiving optical system 4, and output the detected angle signals to a control means 20.

In response to the outputs from the turning angle detecting sensors 11L and 11R, the control means 20 calculates a vehicle distance "L" between the preceding vehicle 100 and the self-vehicle 200, and also a direction "$\theta$" of the preceding vehicle 100.

It should be noted that both the optical system rotation control means 21 and control means 20 may be united as a computer 25.

Referring now to flowcharts shown in FIGS. 1a and 1b, operations will be described. In FIG. 1a, when a main routine starts (step S1), CPU (computer unit 25) is initialized at a step S2.

Next, at a step S3, a flag check is made, and waits until the flag becomes true. This flag becomes true by way of a process of an interrupt routine.

That is to say, when both of the light receiving signals are input into the computer 25, the program control is moved to the interrupt routine.

Once the interrupt operation starts at a step S8 represented in FIG. 1b, first of all the light position signal is read and the following calculations are executed at a step 9. That is to say, as indicated in FIG. 2, angles $\Delta\phi_L$ and $\Delta\phi_R$ defined between the optical axes 5 of the light-receiving lens 41L and 41R and a line for connecting the light source 1 and a principal point 40 of the light-receiving lens 41L and 41R, are calculated based on a calculation formula: $\Delta\phi=\tan^{-1}(\Delta P/F)$, when "F" indicates a distance between the principal point 40 and the optical position detectors 42L and 42R, and "$\Delta P$" denotes a shift between the principal point 40 of the lens and light source 1 in the light position detectors 42L and 42R.

Subsequently, at a step S10, the optical system rotation control means 21 drives the drive means 10L, 10R via the rotation control means 9L, 9R so as to rotate the light-receiving optical system 4, respectively.

In other words, this interrupt routine is to control the turning angle of the light-receiving optical system 4 in such a manner that the optical axes of the light-receiving lenses 41L and 41R are coincident with the line for connecting the light source 1 and the principal point 40 of light-receiving lenses 41L and 41R.

Finally, the turning angle of the light-receiving optical system 4 sets the flag indicating that the axes of the light-receiving lens 41L and 41R are coincident with the line for connecting the light source 1 and the principal point 40 of the light-receiving lens 41L and 41R, to true (at a step S11), whereby the interrupt routine is ended (at a step S12).

As previously described, when the flag is set to true, according to the main routine, the turning angles $\phi_L$, $\phi_R$ (FIG. 13) of the light-receiving optical system 4 is read at the step S4 shown in FIG. 1a by the turning angle sensors 11L and 11R, the vehicle distance L and direction $\theta$ are calculated at a step S6 based upon equations (3), (4) (will be described later), and the vehicle distance L and direction $\theta$ are output at the step S6.

Finally, at the step S7, the flag is cleared (FAIL) and the process is returned to the flag check operation at the step S3, and the subsequent interrupt routine process is accomplished and waits until the flag becomes true.

In the above described detections of such parameters as the inter-vehicle distance, in case that there is a clear light/dark distribution in a background light, when the light-receiving optical system 4 is rotated by the turning angle of $\Delta\phi$ in conjunction with the movement of the light source 1, the light/dark distribution of the background light is accordingly varied.

Now considering arbitrary positions on the light position detectors 42L and 42R, the light incident upon these positions becomes an intermittent mode due to the variation of the light/dark distribution of the background light.

As a consequence, no discrimination can be made that this intermittent light comes from the light source 1 equipped with the preceding vehicle 100, or the variations of the background light caused by the rotation of the mirror. Then, in such a place that the light/dark distribution is present in the background light, it is difficult to detect a correct vehicle distance.

If the light-receiving optical system 4 is slowly rotated in order not to form the background light as the intermittent light, the time intervals to detect the vehicle distance "L" or the like are prolonged and therefore there is another problem that the response characteristics are deteriorated.

Also, another automatic tracking apparatus for automatically maintaining a safe vehicle distance between a preceding vehicle and a self-vehicle is disclosed in, for example, Japanese Laid-open patent application No. 60-19208 and No. 60-163732. These conventional apparatus are so constructed that both the throttle valve and brake are automatically actuated in response to outputs derived from the inter-vehicle sensing means so as to continuously keep the vehicle distance between the preceding vehicle and the self-vehicle at a safe inter-vehicle. Then, the vehicle distance sensing means projects either the electromagnetic wave or ultrasonic wave to the preceding vehicle, and receives the reflections from the preceding vehicle so as to sense the vehicle distance between the preceding and the self-vehicle based upon the time required for such a wave transmission and reception. As a consequence, although the distance between the preceding vehicle and tracking vehicle can be correctly detected, the positional shifts between the driving lanes of the preceding vehicle and tracking vehicle cannot be sensed.

SUMMARY OF THE INVENTION

The present invention has been made in an attempt to solve the above-described problems of the conventional radar apparatus, and therefore has a primary object to provide an automobile radar apparatus capable of continuously detecting both a distance and a direction of a preceding vehicle in a stable condition over a long time period irrelevant to variations of environment and also aging effects of optical elements.

A secondary object of the present invention is to provide an automobile radar apparatus with better response characteristics, capable of correctly detecting a vehicle's direction and distance by eliminating an adverse influence of background light even in such a place where a light/dark distribution is present in the background light.

A third object of the present invention is to provide a preceding vehicle tracking control apparatus equipped with an automobile radar apparatus capable of sensing a positional shift in the driving lane between the preceding vehicle and tracking vehicle, and further capable of sensing inter vehicle distance for safety immediately after a tracking control is instructed from a vehicle driver.

An automobile radar apparatus according to the present invention includes a:

light source means installed at a predetermined position of a rear side of a preceding vehicle, for projecting either light or pulse-modulated light backwards;

a pair of light-receiving optical systems separately positioned on a front side of a self-vehicle (tracking vehicle) with a predetermined interval, and having two light-receiving light paths for receiving the light emitted from said light source means;

a photoelectric transducer for focusing an image of said light source means onto a focal plane of both of said light-receiving light paths;

image formation position calculating means for calculating image formation positions in a horizontal direction at the focal plane with respect to the two light-receiving paths from the output of the photoelectric transducer;

rotating means for rotating said light-receiving optical systems in the horizontal direction, and, angle detecting means for detecting a turning angle of said light-receiving optical systems driven by the rotating means.

Also, an automobile radar apparatus according to the present invention comprises:

a light position detector arranged on a rotatable optical system provided at a predetermined position of a front side of a self-vehicle, for detecting a position of a signal ray emitted from a light source positioned at a rear side of a preceding vehicle; and optical rotation control means for outputting a control signal to control a rotation of an optical system when an output from the light position detector exceeds over a predetermined value, and for neglecting the output derived from the light position detector during a predetermined time period after the light position detector receives the light, or said control signal is output.

Furthermore, a preceding vehicle tracking control apparatus, according to the present invention, for tracking the preceding vehicle, even while the distance between the preceding vehicle and a self-vehicle is maintained at a predetermined safe vehicle distance, comprises:

an automobile radar apparatus functioning as vehicle distance sensing means installed on a tracking vehicle and constructed of a light source means provided on said preceding vehicle, a pair of light-receiving optical systems for sensing light emitted from the light source means, and a rotating (pivoting) apparatus for rotating said light-receiving optical systems toward said light source means;

instructing means for instruction a tracking drive control to said preceding vehicle; and, returning means for rotatably returning said light-receiving optical systems to a predetermined reference position before said tracking drive control is commenced.

The above-described objects and other objects, as well as novel features of the present invention will be apparent from the following detailed descriptions with reference to accompanying drawings. However, these drawings are merely explanatory not restrictive of the scope of the present invention.

BRIEF DESCRIPTION OF THE DRAWINGS

FIG. 1 is a flowchart for representing an operation of the conventional automobile radar apparatus, in which FIG. 1(a) indicates a main routine, and FIG. 1(b) represents an interrupt routine;

FIG. 5 illustrates a part of an optical system;

FIG. 8 is a schematic diagram of an optical system according to the second preferred embodiment;

DETAILED DESCRIPTION OF THE PREFERRED EMBODIMENTS

Figure 3:
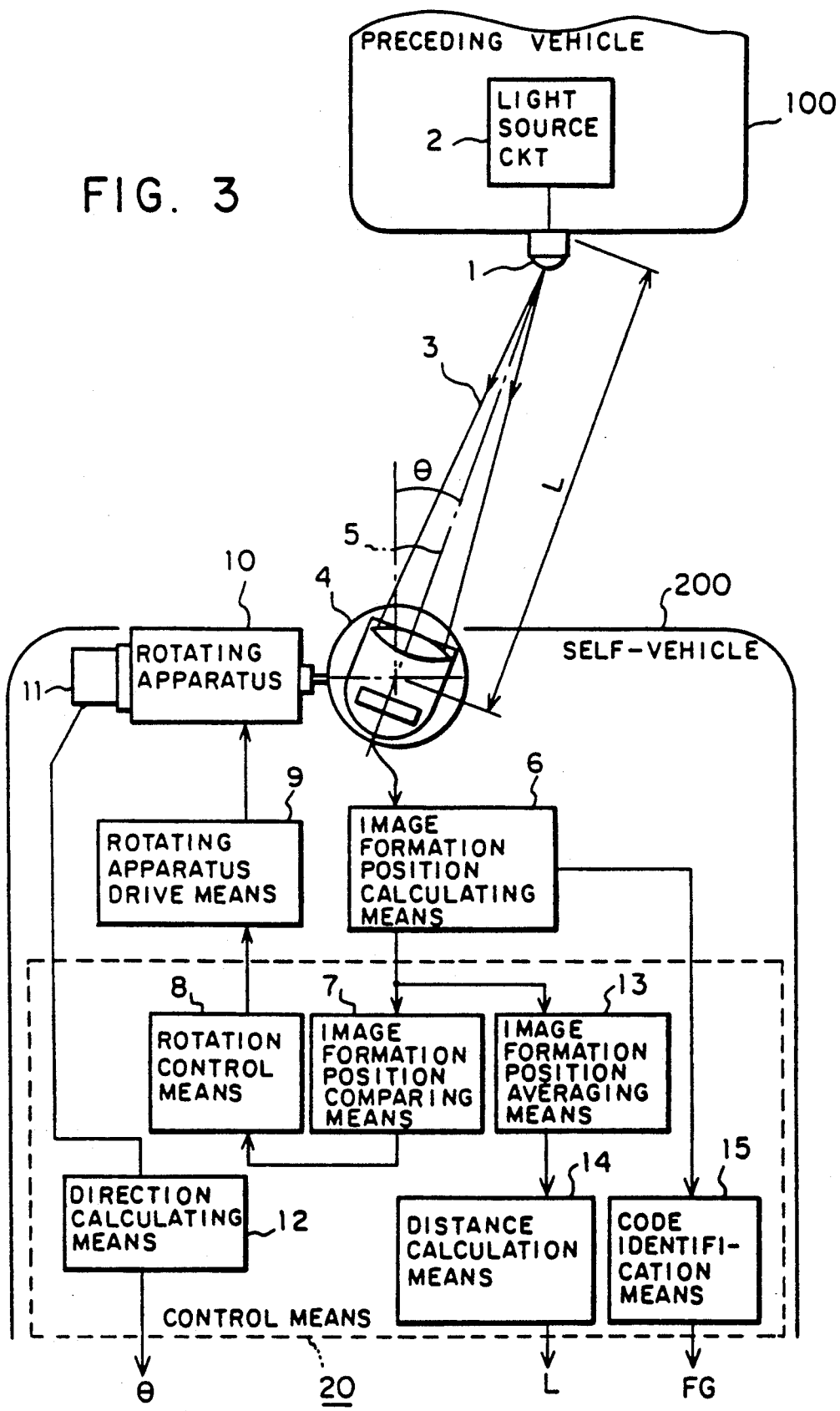
FIG. 3 is a construction diagram of an automobile radar apparatus according to a first preferred embodiment.

Referring now to figures, a first preferred embodiment of the present invention will be described. FIG. 3 is a construction diagram of an automobile radar apparatus according to the present invention. In FIG. 3, reference numeral 1 denotes a light source installed on a center of a rear side (portion) of a preceding vehicle 100, reference numeral 2 indicates a light source circuit for emitting light 3 projected from the light source 1, reference numeral 4 represents a light-receiving optical system installed on a front side of a self-vehicle 200 (tracking vehicle), reference numeral 5 is an optical axis of the light-receiving optical system 4; reference numeral 6 denotes an image formation position calculating means for an image of the light source 1 focused onto the light-receiving optical system 4; reference numeral 7 indicates an image formation position comparing means; reference numeral 8 denotes a rotating apparatus control means; reference numeral 9 represents a rotating apparatus drive means; reference numeral 10 is a rotating apparatus for rotating the light-receiving optical system 4 in a horizontal direction; reference numeral 11 is a turning angle detector of the rotating apparatus 10; reference numeral 12 represents a direction calculating means; reference numeral 13 is an image formation position averaging means; reference numeral 14 represents a distance calculating means; reference numeral 15 indicates a code identification means; and reference numeral 20 denotes a control apparatus.

Figure 4:
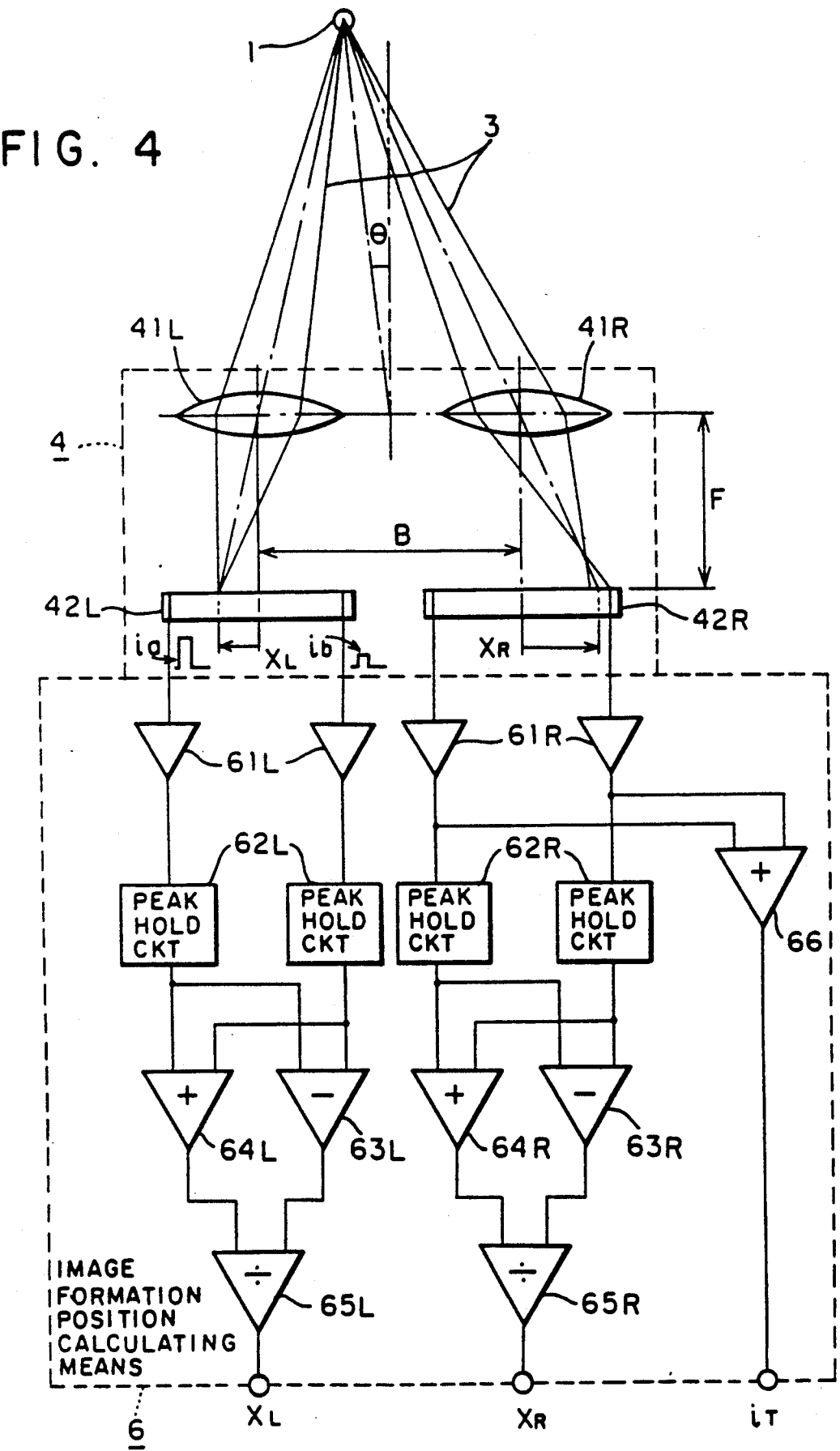
FIG. 4 is a detailed illustration for explaining a calculation on an image formation position.

FIG. 4 is a detailed explanatory diagram for calculating an image formation position according to the present invention. In FIG. 4, a suffix R(L) of a symbol represents a right-sided (left-sided) light-receiving light path of the light-receiving optical system 4, reference numeral 41 denotes a light-receiving lens in this light-receiving light path; reference numeral 42 indicates a photoelectric transducer positioned near a focal plane of the light-receiving lens 41, which employs a semiconductor light position detector (referred to as a "PSD"), reference numeral 61 is an amplifier circuit for PSD42; reference numeral 62 denotes a peak hold circuit; reference numeral 63 indicates a subtracter circuit; reference numeral 64 indicates an adder circuit; reference numeral 65 denotes a divider circuit; and reference numeral 66 is a pulse adding circuit. FIG. 5 illustrates a part of the optical system according to the first preferred embodiment of the present invention. In FIG. 5, reference numeral 43 is a cylindrical lens and reference numeral 44 is an image elongated along a longitudinal direction.

A description will now be made to the above-described first preferred embodiment of the invention. In FIG. 3, the light source 1 is installed at a predetermined position of the rear side (will be explained as a center of the rear side) of the preceding vehicle 100, from which the projection light 3 is emitted backwards by the light source circuit 2. As this light source 1, a visible light source such as a visible LED may be employed. However, to prevent the deterioration of S/N ratio caused by noises such as background light, a near infrared light source such as a near infrared LED having a wavelength less than 1 micrometer is preferable as the light source 1. Therefore, a near infrared LED will now be employed in the following descriptions.

As the projection light 3, modulated light, the pulse period and emission time of which have been coded for the respective vehicles may be useful for a tracking vehicle identification purpose. At a preselected position of a front side (will be described as a center of the front side) of a self-vehicle 200, the light-receiving optical system 4 is positioned which is supported rotatably in the horizontal direction by the rotating apparatus 10. The turning angle detector 11 for detecting a turning angle "$\theta$" from a vehicle shaft of the light-receiving optical system 4 is fixed on the rotating apparatus 10.

As represented in FIG. 4, when the projection light 3 is emitted from the light source 1, the projection light 3 is collected by way of the light-receiving lens 41R and 41L which are separated in parallel thereto with a length of a base length B, while the projection light 3 is subdivided into two optical paths. This light-receiving optical system 4 enables the image of the light source 1 to be focused onto PSD 42R and 42L installed on the focal planes of the respective light-receiving lens 41R and 41L. It should be noted that as represented in FIG. 5, both the light-receiving lens 41 and cylindrical lens 43 are provided in the respective light-receiving optical paths of the light-receiving optical system 4, and an image 44 of the light source 1 having a width longer than a width "H" of PSD 42 is formed on PSD 42. The image 44 has a length elongated along the longitudinal direction.

In accordance with the above-described arrangement, even when there exists a vertical shift in the optical axis between the optical source 1 and light-receiving optical system 4 due to the reasons of vibrations and pitching's of the preceding vehicle 100 and self-vehicle 200, a portion of the image 44 is always projected to PSD 42. As a result, stable operations can be achieved irrelevant to the load conditions. Although the light-receiving lens 41 is separated from the cylindrical lens 43 in this figure, if the light-receiving lens 41 is formed as an aspherical lens so as to add the function of the cylindrical lens 43 thereto, the overall lens system can be made simple and the light-receiving optical system 4 can be made more bright. If the centers of the respective PSD 42R and 42L are arranged in such a manner that these centers are positioned outside centers of the optical axes of the light-receiving lens 41R and 41L in response to the measuring range of the distance and direction up to the preceding vehicle 100, an effective light-receiving length of PSD can be more effectively utilized. For the sake of simplicity of explanations on the image formation positions, the present example represents such an arrangement that the centers of the effective light-receiving lengths of PSD 42R and 43R are coincident with the centers of the optical axes of the respective light-receiving lens 41R and 41L. The image formation position of the light source 1 on PSD 42 is calculated from the following equation:

$$X = D[(ia - ib)/(ia + ib)]/2 \quad (1),$$

based upon light currents "ia" and "ib" output from both electrodes of PSD 42 and an effective light-receiving length "D" (not shown in detail) of PSD 42, assuming that a distance between a light gravity position of an image and a center of PSD 42 is equal to "X".

In the image formation position calculating means 6, the light currents "ia" and "ib" of PSD 42 are amplified by the amplifier 61, after only a pulse current component functioning as a signal is extracted, the resultant signal is converted into a DC voltage signal by a peak hold circuit 62, the above-described equation (1) is calculated through the subtracter circuit 63, adder circuit 64, and divider circuit 65, and the image formation positions $X_R$ and $X_L$ corresponding to the respective optical paths are output. Also, a total pulse current "$i_T$" of PSD 42R is output as a pulse code identification signal of the light source 1 to the code identification means 15 by way of the pulse adder circuit 66. When the image formation positions $X_R$ and $X_L$ are output from the image formation calculating means 6, a difference $\Delta X(=X_R-X_L)$ between the image formation positions $X_R$ and $X_L$ is calculated by the image formation position comparing means 7, a rotation control signal corresponding to this difference $\Delta X$ is calculated by the rotating apparatus control means, and the rotating apparatus 10 is driven via the rotating apparatus drive means 9 in such a manner that the light-receiving optical axis 5 of the light-receiving optical system 4 is directed to the light source 1, namely the difference $\Delta X$ of the image formation positions becomes zero. The turning angle "$\theta$" of the light-receiving optical system 4 is detected during the rotation control operation by the angle detector 11, and converted into a proper electric signal at the direction calculating means 12. On the other hand, the image formation positions $X_R$ and $X_L$ during the rotation control operation are output to the image formation position averaging means 13 wherein an averaged image formation position $X$ ($=X_R=X_L$) is calculated, and the distance calculating means 14 calculates a distance "L" up to the preceding vehicle by $L=FB/2X$ based upon this averaged image formation position $X$ and outputs the distance. It should be noted that symbol "F" indicates a distance from the light-receiving lens 41 to PSD 42, and as previously explained, is substantially equal to a focal length of the light-receiving lens 41. The total pulse current "$i_T$" of PSD 42R is output to the code identification means 15 which outputs an identification abnormal flag by monitoring a change in the pulse code of the light source 1 of the preceding vehicle 100 in such cases that the preceding vehicle 100 is substituted by another vehicle, and a disturbing article existing between the preceding vehicle 100 and self-vehicle 200 is sensed. In other words, according to the above-described construction, since the distance "L" up to the preceding vehicle 100 and the direction "$\theta$" are determined by controlling the image formation positions of the light source 1 at the light-receiving optical system 4, there is a particular advantage that even when the emission amount of the light source 1 and light-receiving efficiency of the light-receiving optical system 4 are varied, a stable operation can be achieved.

Figure 6:
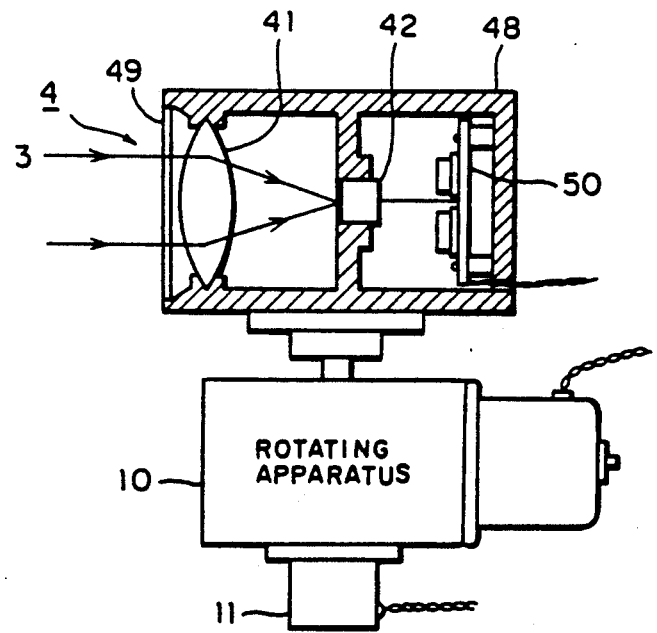
FIG. 6 is a construction diagram for representing both a sectional view of a light-receiving optical system and a rotating apparatus.

FIG. 6 is a partially sectional view of the light-receiving optical system and the rotating unit thereof. The light-receiving optical system 4 is so arranged that a visible light cut filter 49 for eliminating background light, a light-receiving lens 41, and PSD 42 are mounted on a case 48. Since the magnification of the optical system is very small, the image formation plane of PSD 42 is arranged near the focal plane of the light-receiving lens 41. Also, since the dark optical system is necessarily formed due to the facts that the radar system is mounted on the vehicle and the aperture of the light-receiving lens 41 is made not so large, and further the photo current output from PSD 42 is normally small, a circuit board 50 of the light-receiving circuit is stored within a case 48 so as to improve a signal-to-noise ratio of the light-receiving circuit against the external electric noise. In general, either the image formation position calculating means 6, or a portion thereof is provided on the circuit board 50. If the circuitry is manufactured as an LSI, and the rotating apparatus control means 8 and/or the rotating apparatus drive means 9 together with the image formation position calculating means 6 are stored within the case 48, the overall radar apparatus may be formed in compact. The rotating apparatus 10 may be used in combination with a DC motor or a pulse motor and a speed reducer without any backrush. The turning angle detector 11 may utilize a potentiometer and a rotary encoder. Furthermore, in FIG. 3, although the image formation position comparing means 7, rotating apparatus control means 8, direction calculating means 12, distance calculating means 14, and code identifying means 15 are separately arranged, it may be useful to employ a computer under digital control in case that a pulse motor is used in this rotating apparatus 10, and the various functions of the above-described means may be realized by the control apparatus 20 for processing these circuits with a software of the computer In this case, the turning angle of the light-receiving optical system 4 may be calculated in such a manner that a drive control pulse of the pulse motor is accumulated by a pulse counter employed in the control apparatus 20, and this accumulated value is multiplied by the step angle of the pulse motor. As a result, the turning angle detector 11 is no longer required and also any servo control system such as in use of the DC motor is not required, whereby there is a particular advantage that the rotation control is simplified.

Figure 7:
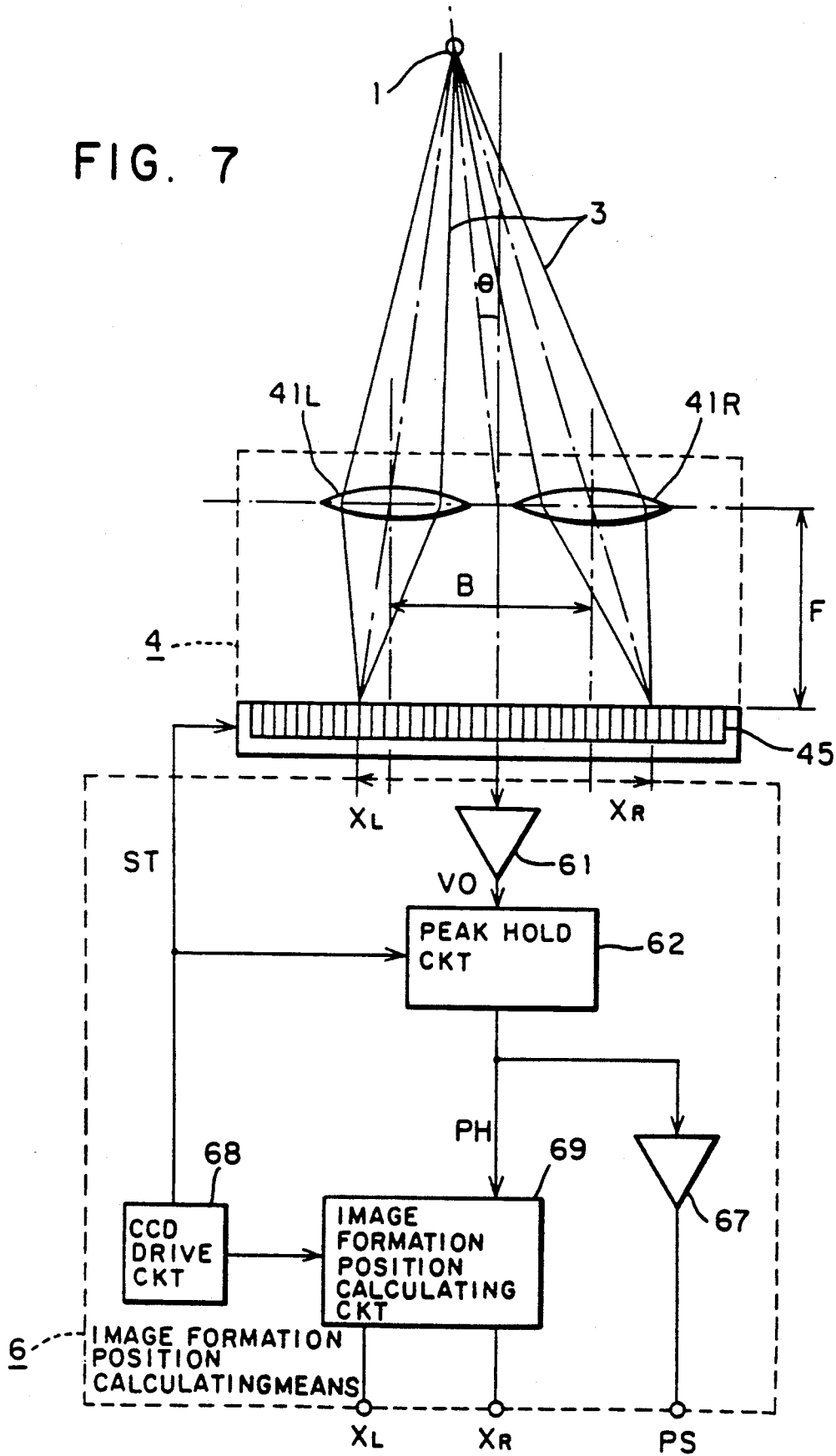
FIG. 7 is a detailed explanatory diagram of a calculation on an image formation position according to a second preferred embodiment of the present invention.
Figure 9:
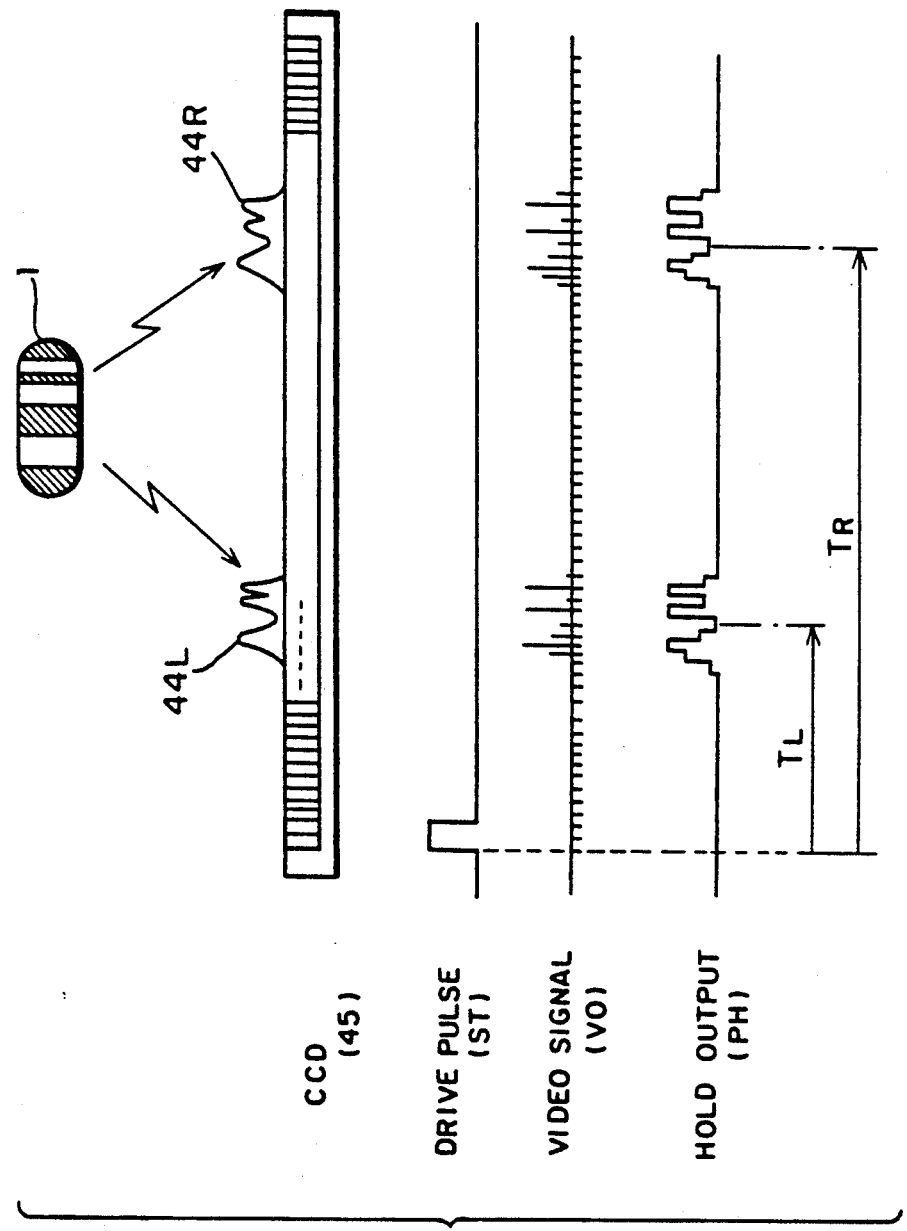
FIG. 9 is an explanatory diagram of an image formation position calculation on CCD.

FIGS. 7 to 9 illustrate a second preferred embodiment of the present invention. FIG. 7 is a detailed explanatory diagram of an image formation position calculation. In FIG. 7, reference numeral 45 denotes a photoelectric transducer positioned at a substantially focal plane of a focusing lens 41, in which a one-dimensional CCD is employed, reference numeral 67 denotes a video signal comparing circuit; reference numeral 68 is a CCD drive circuit; and reference numeral 69 indicates an image formation position calculation circuit FIG. 8 represents a part of the optical system, in which reference numeral 46 indicates a cylindrical lens to which a predetermined occulting code 47 has been added by printing in a vertical direction with respect to an optical axis thereof as a center. FIG. 9 is an illustration for explaining a method for calculating image formation positions on CCD 45.

Then, operation of the second preferred embodiment will now be described with reference to the respective figures. In FIG. 7, when the projection light 3 is emitted from the light source 1, the light-receiving optical system 4 separates the projection light 3 into two optical paths by way of the light-receiving lens 41R and 41L which have been separated with each other in parallel thereto by a base length "B" so as to collect the projection light 3, and focuses images of the light source 1 onto CCD 45 fixed on the focal planes of the respective light-receiving lens 41. As seen from FIG. 8, assuming that light emitted from the light source 1 is equal to the projection light 3 which has passed through the cylindrical lens 46 having the occulting code 47, an image 44 elongated along the longitudinal direction and having a predetermined contrast pattern in a vertical direction is formed on CCD 45. It is preferable to emit a pulse similar to the above-described first preferred embodiment as the optical source 1, since generally CCD owns a high sensitivity in a visible range. However, in accordance with the second preferred embodiment, since the code identification is carried out by the contrast pattern, it is sufficient to emit pulses having a sufficiently lower frequency than that of the CCD drive frequency. Accordingly, either a red LED, or an infrared LED having wave lengths of 600 to 900 nm may be employed. CCD 45 is arranged in such a manner that a center thereof is coincident with the center of both the light-receiving paths of the light-receiving optical system 4, in other words, the optical axis of the light-receiving optical system 4. As shown in FIG. 9, the images 44R and 44L of the optical source 1 each having a predetermined contrast pattern corresponding to both of the light-receiving paths are focused onto CCD 45, which are read out as a video signal VO via the amplifier circuit 61 in response to a drive pulse ST of the CCD drive circuit 68. Signals of the respective pixels of the video signal VO are held via the peak hold circuit 62 and then fed out as a hold output "PH" to the image formation position calculating circuit 69. The image formation position calculating circuit 69 calculates the hold output PH so as to obtain a luminance gravity position, and further calculates the image formation positions $X_R$ and $X_L$ by the following equations based upon times $T_R$ and $T_L$ measured from the drive pulse ST to the gravity positions of the respective images 44R and 44L, and the scanning velocity "V" of CCD 45:

$$X_R = (T_R \cdot V - N)\Delta - B/2,$$

$$X_L = (N - T_L \cdot V)\Delta - B/2 \qquad (2),$$

where 2N and $\Delta$ denote a pixel number and a pixel pitch of CCD 45 respectively When the image formation positions $X_R$ and $X_L$ are output from the image formation calculating means 6, a calculation is made to obtain a difference $\Delta X (= X_R - X_L)$ between these image formation positions $X_R$ and $X_L$, the rotating apparatus 10 is driven in response to the difference $\Delta X$, which is similar to that of the first preferred embodiment, the light-receiving optical axis 5 of the light-receiving light system 4 is directed to the direction of the light source 1 under the rotation control of the rotating apparatus 10 so as to detect the turning angle "$\theta$", whereas a distance "L" up to the preceding vehicle 100 is calculated by the distance calculating means 14 based upon the image formation positions $X_R$ and $X_L$ during the rotation control operation. Further, the hold output PH is waveform-shaped in the video signal comparing circuit 67, and the pulse series "PS" is supplied to the code identifying means 15 whereby the contrast code of the light source 1 of the preceding vehicle 100 is monitored.

Also in accordance with the above-described arrangement, the particular advantages similar to the first preferred embodiment can be expected. Moreover, since only one photoelectric transducer is required, the radar apparatus can be manufactured in low cost, and also the higher positioning precision of the single photoelectric transducer can be readily achieved so that there is another particular merit that the higher distance detecting precision can be realized.

Figure 10:
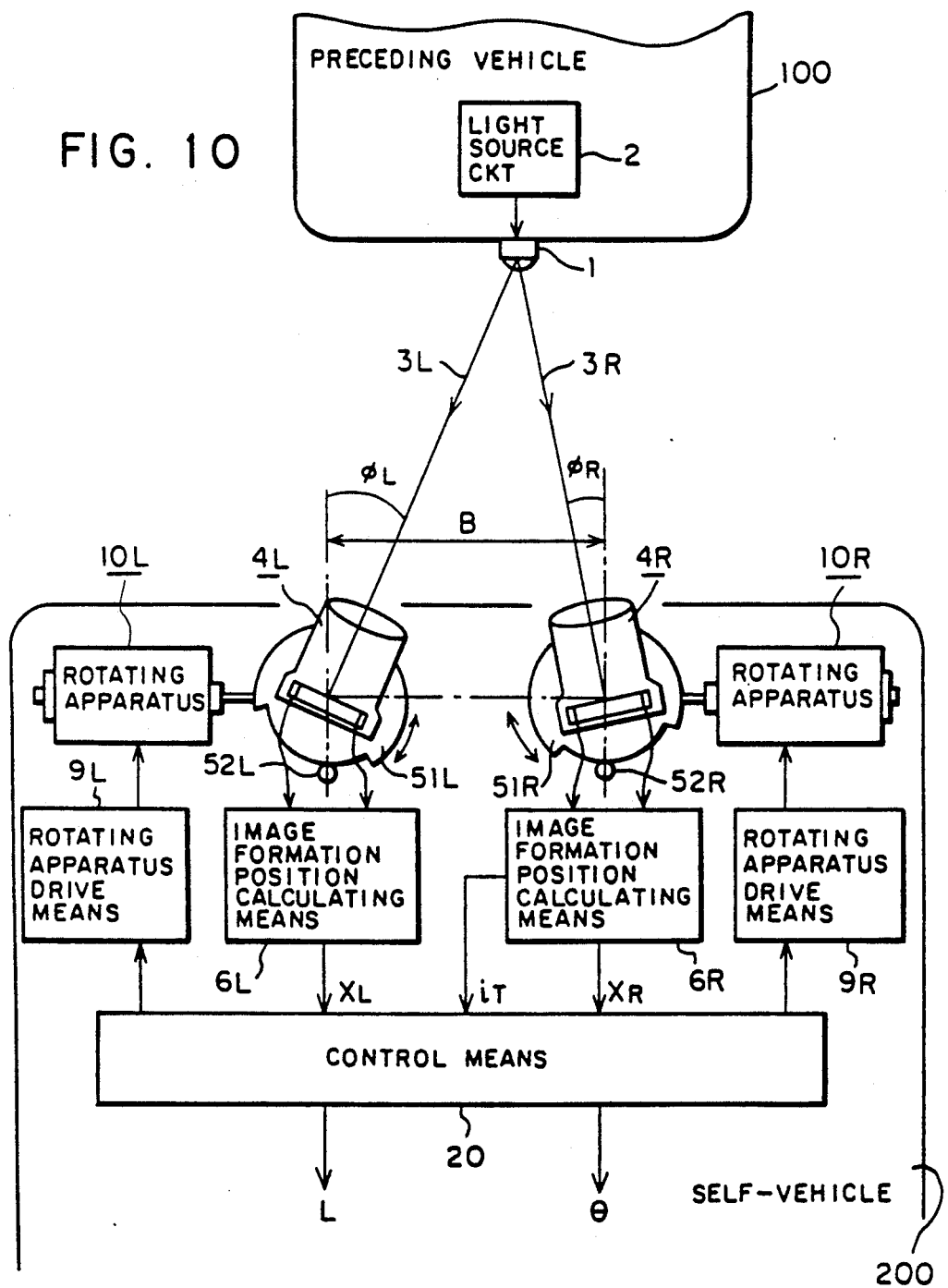
FIG. 10 is a construction diagram of an automobile radar apparatus according to a third preferred embodiment of the present invention.

FIG. 10 is a schematic diagram of an arrangement of an automobile radar apparatus according to a third preferred embodiment of the present invention. In this preferred embodiment, there is shown a pulse motor functioning as the rotating apparatus 10. Reference numeral 51 denotes a rotating table the rotating range of which is mechanically defined by a stopper 52; and reference numeral 20 is CPU. Under the control of CPU, a pulse drive signal is supplied to the rotating apparatus drive means 9 by receiving the inputs of the image formation positions $X_R$ and $X_L$ so as to control the rotating apparatus 10 in a pulse drive mode, and senses turning angles $\phi R$ and $\phi L$ of the respective light-receiving optical systems 4 in response to the pulse drive signal, and furthermore calculates both a distance "L" and a direction "$\theta$" up to the preceding vehicle 100 by utilizing the following equations (3) and (4);

$$\theta = \tan^{-1}[(\tan\phi L - \tan\phi R)/2] \qquad (3)$$

$$L = B/[(\tan\phi L + \tan\phi R)\cos\theta] \qquad (4)$$

That is to say, CPU 20 first supplies the pulse higher than the mechanical defining angle to the rotating apparatus drive means 9 in order that after the rotating table 51 is depressed to the stopper 52, this table is driven in a predetermined number of pulses in the reverse direction, whereby the initial position of the light-receiving optical system 4 is determined and the pulse counter (not shown) employed within CPU is reset. Next, the rotating apparatus 10 is driven in a pulse mode along either a normal direction, or an opposite direction in such a manner that each of the image formation positions $X_R$ and $X_L$ of the light receiving optical system 4 becomes zero under the rotation control. At this time, the pulse counter accumulates each of these drive pulses, and the turning angles $\phi R$ and $\phi L$ of the light-receiving optical system 4 is calculated by multiplying each of these accumulated values Na, Nb by the step angle $\Delta\phi$ of the pulse motor. To CPU 20, a total pulse current "iT" functioning as the pulse code identification signal of the light source 1 is input, variations in the pulse code of the light source 1 is monitored, and the signals representative of the distance "L" and direction "$\theta$" are changed to be output in case that the preceding vehicle 100 is substituted by another vehicle, and a disturbance existing between the preceding vehicle 100 and tracking vehicle 200 is sensed. In accordance with the above-described arrangements, there are advantages that any angle detector 11 is no longer required by utilizing the pulse motor, and the rotating control is simplified.

Figure 2:
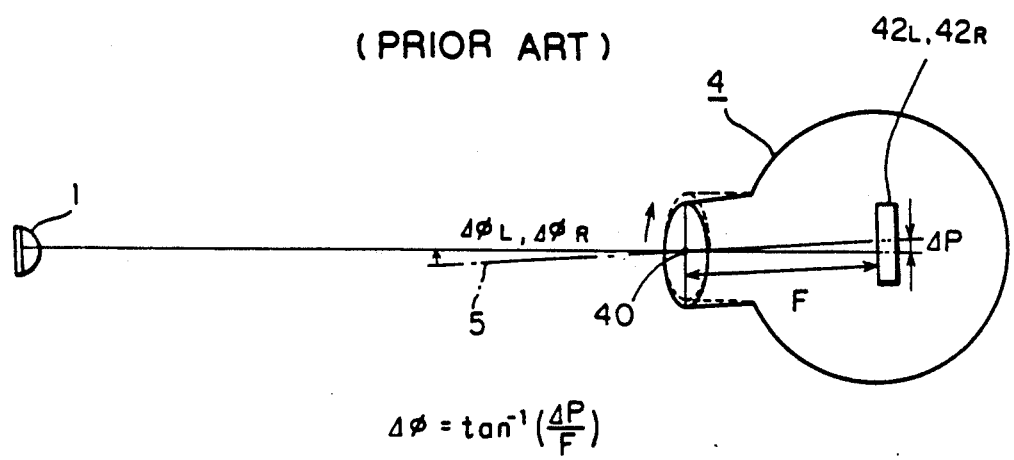
FIG. 2 is an illustration for explaining a turning angle control of the optical system employed in the conventional radar apparatus.
Figure 11:
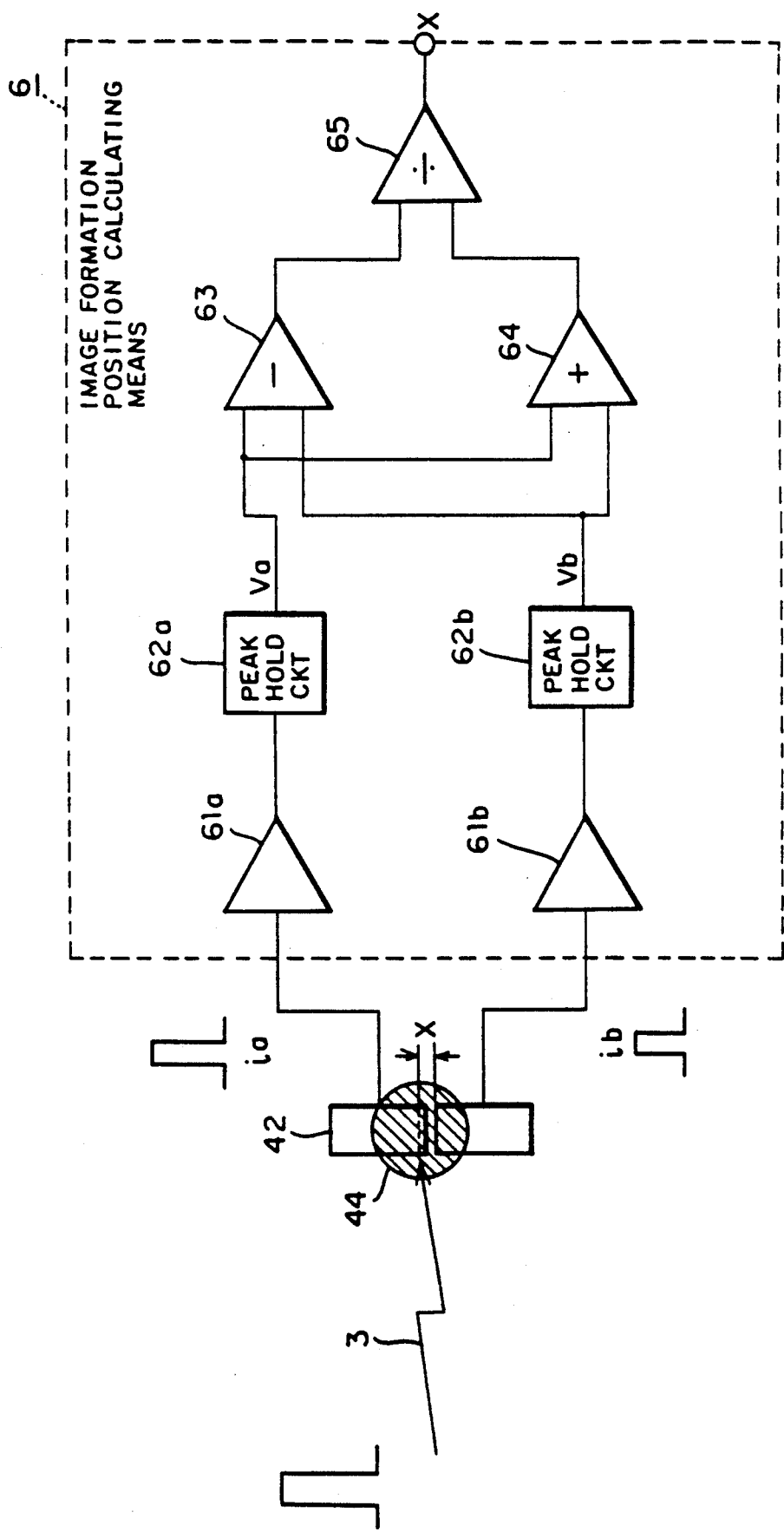
FIG. 11 is a circuit diagram of another image formation position calculating means when a photodiode is employed as the photoelectric transducer according to the third preferred embodiment.

In FIG. 11, there is shown a schematic diagram of a circuit arrangement of another image formation position calculating means according to this preferred embodiment That is to say, there is represented an example where a pair of photodiodes 42a and 42b are employed as the photoelectric transducer. When an image 44 of the light source 1 is formed on these photodiodes 42a and 42b, divided photo-currents "ia" and "ib" flow through these photodiodes 42a and 42b, which correspond to a ratio of image areas projected on the respective photoelectric transducers. As a result, these photo currents "ia" and "ib" are input into the image formation position calculating circuit 6 similar to FIG. 2 so that an image formation position "X" can be detected. With the above-described arrangement, the photoelectric transducer can be manufactured in a low cost, and the radar apparatus can be constructed with a cheaper price.

Figure 12:
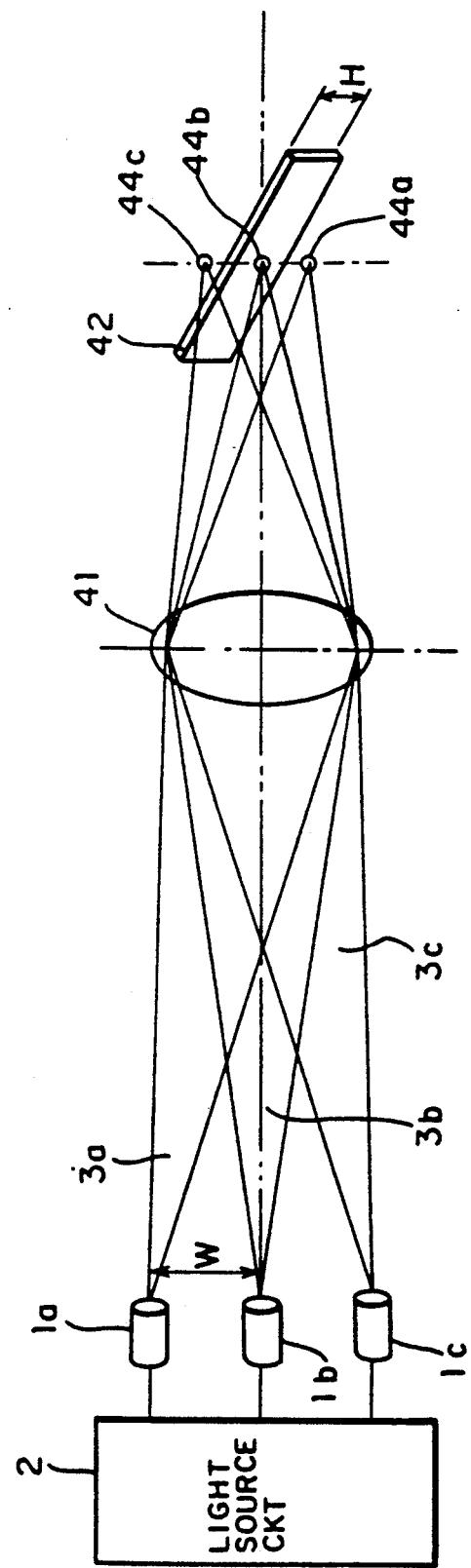
FIG. 12 is a construction diagram of another optical system according to the third preferred embodiment.

Furthermore, in FIG. 12, there is shown such a construction that a plurality of light sources 1a, 1b, 1c are vertically separated at an interval "W" so as to form images 44a, 44b, 44c distributed along the vertical direction on a photoelectric converter 42, and these light sources are arranged in such a way that the interval W < H.Lmin/F ("F" being a focal length of a light-receiving lens 41) is satisfied with respect to a width "H" on the photoelectric transducer 13 where "Lmin" is a minimum vehicle distance sensing distance. As a result, even when the optical axis is shifted in the vertical direction, any of these images 44a, 44b, 44c of the light sources 1a, 1b, 1c can be projected onto the photoelectric transducer 41.

It should be noted that in the above-described preferred embodiment, as to the method for forming the images of the light sources elongated in the vertical direction on the photoelectric transducer, not only the cylindrical lens as described in the preferred embodiment, but also other beam forming means such as a reflecting mirror, a prism, and a light divergent member may be utilized. In addition, according to the above-described preferred embodiment, although the present invention has been applied to the vehicle radar apparatus for automobiles, it may be apparently utilized in a radar apparatus for an automobile carrier and other types of vehicles.

Figure 13:
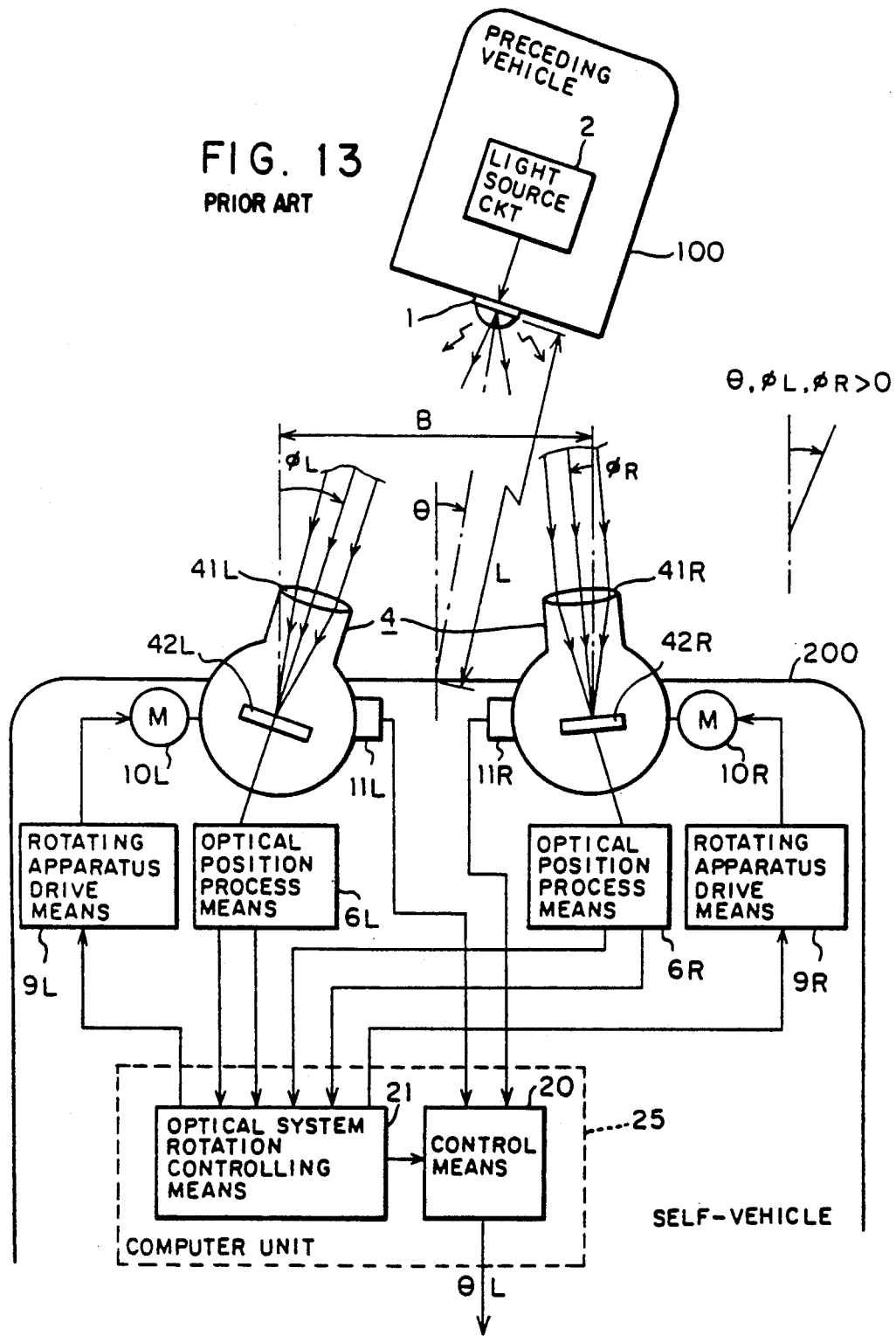
FIG. 13 is a construction diagram of an automobile radar apparatus according to a fourth preferred embodiment of the present invention.

FIG. 13 is a schematic diagram of an automobile radar apparatus according to a fourth preferred embodiment of the present invention. Since the arrangements of this preferred embodiment and explanations thereof were already made, no further explanation is made in the following description.

Operation of this preferred embodiment will now be described. The initial detecting operations of the vehicle distance are identical to that of the conventional method. There is, however an important difference in the fourth preferred embodiment concerning the direction detecting operation. In particular, the a rotating control of the light-receiving optical system by an optical system rotation controlling means 21 is different from that of prior art as shown in FIG. 1.

Figure 14:
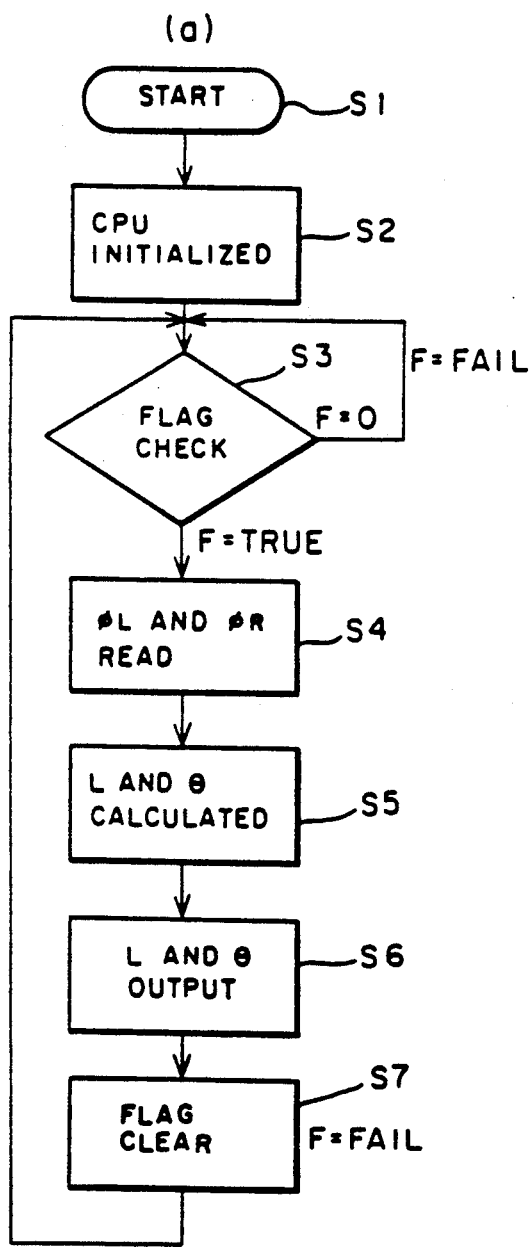
FIG. 14(a) is a flowchart for representing a main routine of operations according to the fourth preferred embodiment.
FIG. 14(b) is a flowchart for explaining an interrupt routine of the fourth preferred embodiment.
Figure 14:
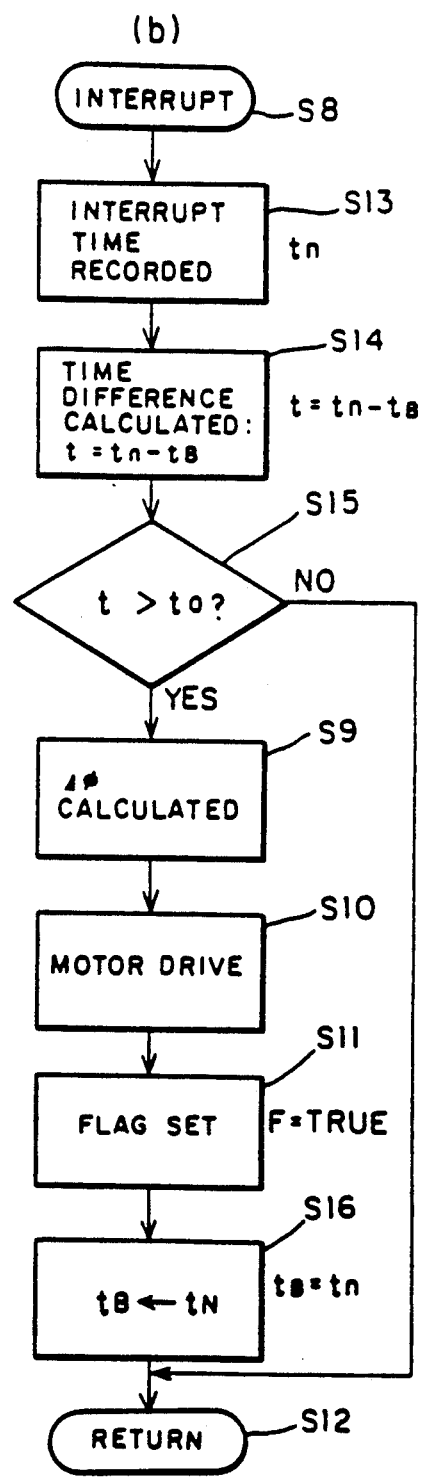

As to this difference, a description will now be made based upon a flowchart shown in FIG. 14. Since the main routine defined at the steps S1 to S7 represented in FIG. 14a is the same as that of the conventional main routine, an explanation thereof is omitted.

Similar to prior art, when a light receiving signal is input into a computer unit 25, a program control is advanced to an interrupt routine.

When the interrupt routine of FIG. 14b starts at a step S8, however, an interrupt time "$t_n$" is recorded at a step S13.

Subsequently, a calculation is made to obtain a difference "t" between the above interrupt time "$t_n$" and last interrupt time "$t_b$" when the light-receiving optical system 4 was rotated by the previous interrupt routine (at a step S14), and a comparison is made between it and a predetermined time "$t_o$" at a step S15.

It should be understood that if the difference "t" between the interrupt time "$t_n$" and last interrupt time "$t_b$" when the light-receiving optical system 4 is rotated by the previous interrupt routine is larger than a predetermined time "$t_o$", namely $t > $ "$t_o$", a calculation is made to $\Delta\phi$ at a step S9 similar to that of prior art, both of the rotation control means 9L and 9R are driven in response to the control signal derived from the optical system rotation controlling means 21 at a step S10, and at a next step S11, the flag is changed into "true".

Thereafter, at a step S16, the last interrupt time $t_b$ is updated by the recorded interrupt time "$t_n$", and this interrupt routine is ended at a step S12.

The above-described predetermined time "$t_o$" may be preferably set longer than a time defined by adding a time period required after at least the light position detecting elements 42L and 42R receive the light, and the computer unit 25 commences to drive the rotating means 10L and 10R via the rotating control means 9L and 9R, to another time period required that when the rotating means 10L and 10R start to drive, this operation is completely accomplished.

Figure 15:
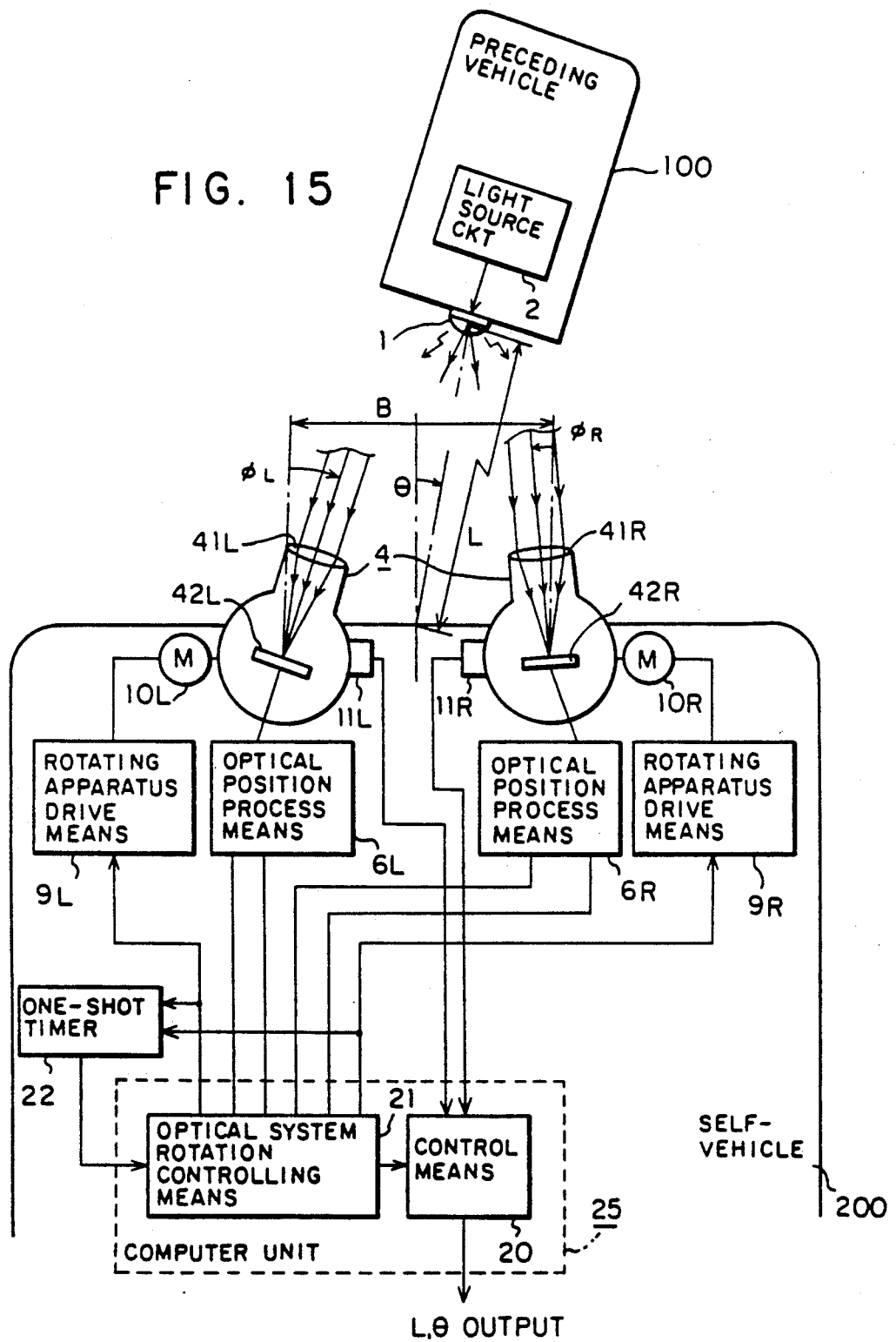
FIG. 15 represents a modified embodiment of the fourth preferred embodiment; and, FIG. 16 is a construction diagram of a preceding vehicle tracking control apparatus according to a fifth preferred embodiment of the present invention.

Referring now to FIG. 15, a modified example of this preferred embodiment will be described. In FIG. 15, it should be noted that the same reference numerals will be employed to denote the components similar to those of FIG. 13, and only different part will now be described. In FIG. 15, reference numeral 22 indicates a one-shot timer triggered in response to a control signal from the optical system rotation controlling means 21 to the rotation control means 9L and 9R, outputs "true" normally, and outputs "fail" for a predetermined time period by the trigger signal. The output of this one-shot timer 22 is input to a computer unit 25.

A flowchart for representing operations of the preferred embodiment shown in FIG. 15 is the same as in prior art, and there is only a difference in a condition that the program control is moved to the interrupt routine.

The transition to the interrupt routine is effected similar to prior art that in addition to the input of the light receiving signal, the output of the one-shot timer 22 becomes true. When the time period of this one-shot timer 22 is set longer than a time period required such that either the rotating means 10L or 10R starts to drive and the operation thereof is completely accomplished, no interrupt occurs due to background light caused by the rotations of the light-receiving optical system 4.

Figure 16:
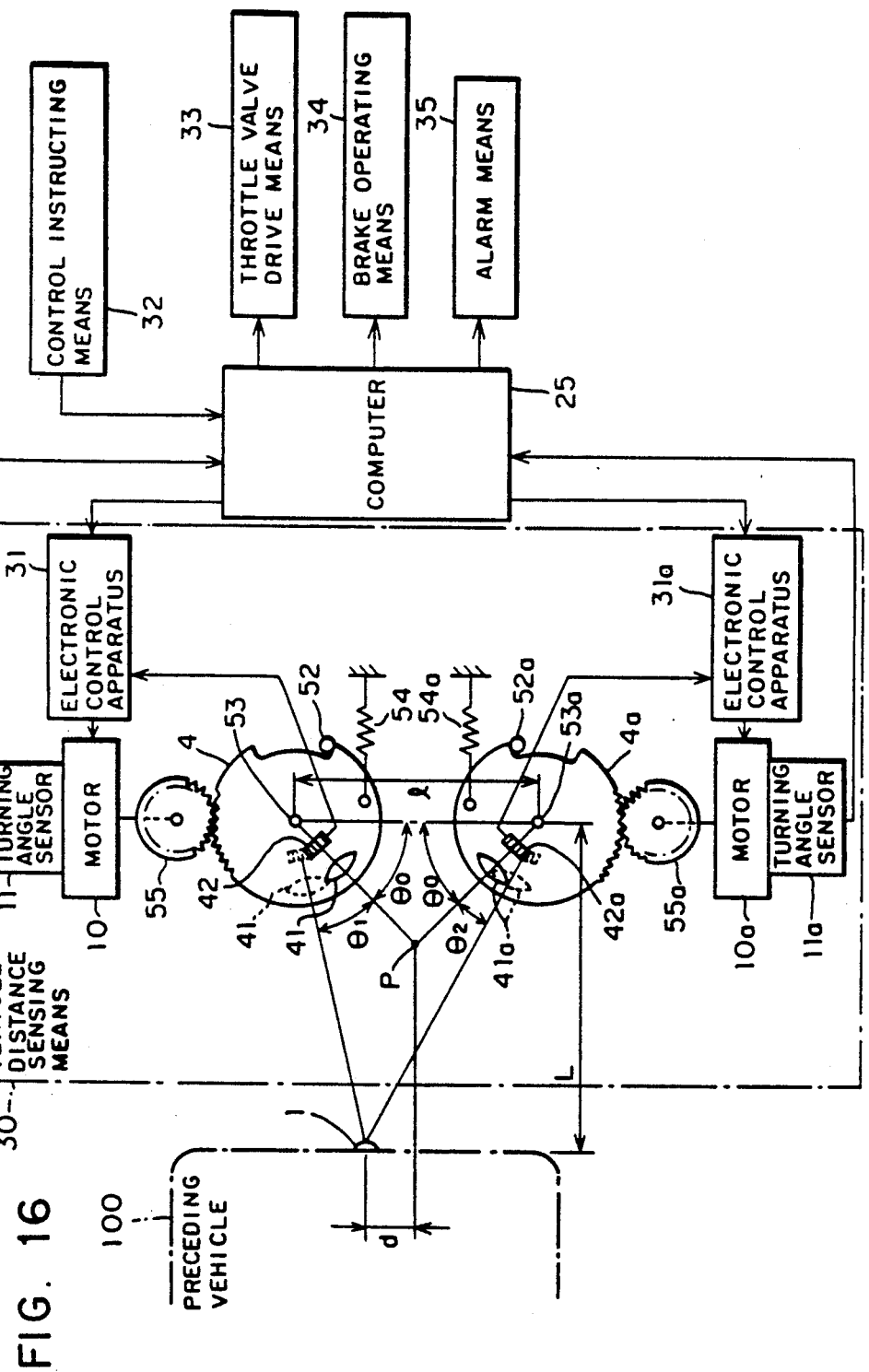

FIG. 16 schematically illustrates a construction of a preceding vehicle tracking control apparatus according to a fifth preferred embodiment of the present invention. In FIG. 16, reference numeral 30 indicates an automobile radar apparatus functioning as a vehicle-distance sensing means installed on a front side of a tracking vehicle (not shown in detail). Reference numeral 41 indicates a first light-receiving lens; reference numeral 42 is a first optical sensor for sensing light collected by the light-receiving lens 41; reference numeral 4 denotes a first light-receiving apparatus on which the above-described first light-receiving lens 41 and first light sensor 42 are mounted, which is pivotally journalled to a pin 53 fixed on a vehicle. Reference numeral 52 is a stopper for limiting a rotation of the above-described first light-receiving apparatus 4. Reference numeral 54 indicates a first return spring for exerting force to the first light receiving apparatus 4 against the stopper 52 along an abutting direction; reference numeral 10 is a first motor for rotating the first light receiving apparatus 4 via a gear 55; reference numeral 11 denotes a first turning angle sensor for sensing a turning angle of the first light-receiving apparatus 4 by detecting a rotation amount of this motor 10; and, reference numeral 31 represents a first electronic control apparatus for driving the motor 10 in response to the output signal from the first light sensor element 42 while the light of the light source 1 incident upon the first light sensor element 42 passes through a center of the light-receiving lens 41, and rotates the first light-receiving apparatus 4 in such a manner that the center of the light-receiving lens 41 is directed to the light source 1.

It should be noted that although the above description was made to only a first arrangement of one side of the vehicle-distance sensing means 30, a second arrangement of the other side thereof is identical to that of the first arrangement. Therefore, on the other side, a suffix "a" is attached to each of reference numerals of the components of the first arrangement and no explanation thereof is made.

The first pin 53 is separated from a second pin 53a at a distance "1". Reference numeral 32 denotes instruction means for instructing a tracking control and constructed of, for instance, a switch and the like operated by a car driver. Reference numeral 33 is a throttle valve drive means constructed of a motor or the like, for controlling the drive of the throttle valve so as to control a vehicle; numeral 34 represents a brake operating means for controlling a brake operation; reference numeral 35 denotes alarm means for warning a car driver by means of a buzzer; and reference numeral 25 is a computer apparatus for controlling the throttle valve driving means 33, brake operating means 34, and alarming means 35, and for calculating a vehicle distance "L" and a shift amount "d" of driving lines in receipt of the output signals derived from the first and second turning angle sensors 11 and 11a.

A description will now be made to an operation of an apparatus with the above-described arrangement. While a vehicle is driven, this vehicle approaches near to a rear side of a preceding vehicle 100 and a car driver instructs a tracking control commencement to the control instructing means 32. Then, the computer apparatus 25 actuates the first and second electronic control apparatuses 31 and 31a, and the operation of the vehicle-distance sensing means 30 is commenced. That is to say, as shown in FIG. 16, the first light-receiving apparatus 4 starts to be rotated from the reference position where this light-receiving apparatus 4 abuts against the stopper 52 by receiving the force of the first return spring 54, in a clockwise direction by the first motor 10. Then, the light of the light source 1 incident upon the first light-receiving lens 41 passes through a center of the light-receiving lens 41 and collected at a center of the first light sensor element 42, namely the first light-receiving lens 41 is rotated by the angle of "$\theta_1$" until a position indicated by a dot line of FIG. 16. On the other hand, similarly, the second light-receiving apparatus 4a is rotated from a reference position shown therein to the counterclockwise direction against the force of the second return spring 54a by the second motor 10a, and the light of the light source 1 incident upon the second light-receiving lens 41a passes through a center of the second light-receiving lens 41a, and rotated to a position where this light is collected to a center of the second light sensing element 42a, namely to a position where the second light-receiving lens 41a is rotated by the angle of $\theta_2$ up to a position indicated by a dot line shown in FIG. 16. Both the turning angles $\theta_1$ and $\theta_2$ are sensed by the first and second turning angle sensors 11 and 11a, respectively. Based upon these sensor signals and the pin interval "1", the position of the light source 1 is calculated by the computer apparatus 25 on the basis of the triangulation method so that both the vehicle distance "L" with respect to the preceding vehicle 100, and the shift amount "d" of the driving lanes are detected. Thereafter, this vehicle distance "L" is compared with the safety vehicle distance which has been previously determined, and then either the throttle valve or brake is driven so as to reduce the difference there between, whereby the velocity of the tracking vehicle is adjusted under the control of the throttle valve drive means 33 and brake operating means 34. When the above-described shift amount "d" becomes greater than a predetermined valve, the alarm means 35 is actuated to warn the car driver.

Subsequently, to interrupt the tracking control operation, when the car driver releases the control instruction means 32, the computer apparatus 25 releases all controls Then, the first light-receiving apparatus 4 is rotated and returned to the reference position as shown in FIG. 16 by the first return spring 54. Similarly, the second light-receiving apparatus 4a is rotatably returned to the reference position by the second return spring 54a. The above-described reference positions are located at the positions defined from rotation centers of the first and second light-receiving apparatuses 4 and 4a by the turning angle "$\theta_0$", and the first and second light-receiving lenses 41 and 41a are positioned as shown in FIG. 16. Under this condition, the vehicle-distance sensing means 30 can sense the minimum vehicle-distance position "P". As previously described, since the position at which the minimum vehicle distance is sensed is set to the reference position, both the first and second light-receiving apparatuses 4 and 4a commence the search operation for seeking the light source 1 of the preceding vehicle from the minimum of the vehicle distance when the tracking control operation is commenced. As a consequence, even when the tracking control operation is instructed under such a condition that the self-vehicle extraordinarily approaches to the preceding vehicle, the vehicle distance can be quickly sensed and therefore the control to achieve the safety vehicle distance is rapid.

It should be noted that the rotating return means of the light-receiving apparatus 4 and 4a are constructed of the return springs 54 and 54a in the above-described preferred embodiment, but these light-receiving apparatus 4 and 4a may be rotated and returned to the reference positions by driving the motors 10 and 10a in a reverse direction.

As described above, in accordance with the first to third preferred embodiments, the light source for projecting the light backwards is mounted on a predetermined position of the rear side of the preceding vehicle, and the light-receiving optical systems are positioned at the front side of the self-vehicle (tracking vehicle) with a predetermined separated distance. These optical systems accept the light emitted from the light source and have two light-receiving optical paths, and further are rotatable in the horizontal direction. The light-receiving optical systems are rotated in such a manner that the optical axes of the light-receiving optical systems are directed to the light source. Based upon this rotation angle, the direction toward the preceding vehicle is calculated and also the calculation is made to obtain the distance to the preceding vehicle based on the image positions in the above light-receiving optical systems. With the above-described arrangements, there are particular advantages of the present invention that both the distance up to the preceding vehicle, and the direction can be detected stably without any variations caused by the background light, soils of the light source and light-receiving systems, temperature changes, emission amounts of the aged light source, and light sensitivities of the light-receiving systems.

Also, in accordance with the fourth preferred embodiment of the present invention, the optical systems are rotated under the control of the optical system rotation controlling means in such a manner that the outputs from the light position detectors are equal to a predetermined value, while supplying the control signal to the rotating means. For a time period after the light position detectors receive the signal light, or after the control signal is output to the rotating means, the outputs derived from the light position detectors are neglected, so that a discrimination can be made between the background light formed in a blocking mode while rotating the optical system, and the blocking light emitted from the light source installed at the rear side of the preceding vehicle, and the turning angle control of the optical systems can be realized based upon only the light emitted from the light source which has been mounted on the rear side of the preceding vehicle. As a consequence, even when there is a light/dark distribution in the background light, the vehicle distance and direction can be correctly obtained without receiving the adverse influences of the background light.

Furthermore, according to the fifth preferred embodiment of the present invention, a pair of light-receiving apparatuses for detecting the light emitted from the light source means provided on the preceding vehicle, are rotated toward the light source means so that both the vehicle distance between the preceding vehicle and tracking vehicle, and the shift amount of the driving lanes are detected. Since the light receiving apparatus is arranged in such a manner that the minimum vehicle distance can be detected before the tracking control is commenced, vehicle collision risk with the preceding vehicle can be avoided even when the tracking control is instructed under such a condition that the tracking vehicle approaches very close to the preceding vehicle. Since the shift amount of the drive lanes with respect to the preceding vehicle can be sensed, the correct tracking control can be realized.

What is claimed is:

1. An automobile radar apparatus comprising:
   light source means installed at a predetermined position on a rear side of a preceding vehicle, for projecting light backwards;
   a pair of spaced-apart light-receiving optical systems separately positioned on a front side of a self-vehicle (tracking vehicle), each of said optical systems having a respective light-receiving light path for receiving and focusing the light emitted from said light source means into an image;
   at least one photoelectric transducer provided at a focal plane of each light-receiving light path, for converting said focused image into electrical output signals;
   image formation position calculating means for calculating image formation positions in a horizontal direction at the focal plane with respect to the two light-receiving paths based upon outputs of the photoelectric transducer(s);
   rotating means for rotating said light-receiving optical systems in the horizontal direction, and,
   angle detecting means for detecting a turning angle of said light-receiving optical system driven by the rotating means,
   wherein said light-receiving optical systems are rotated in response to an output from said image formation position calculating means to realign the light-receiving paths of said light-receiving optical systems with said light source, a direction of the preceding vehicle is calculated based on an output from said angle detecting means, and a distance up to the preceding vehicle is calculated based on the output from said image formation position calculating means.

2. An automobile radar apparatus as claimed in claim 1, wherein each of said light-receiving optical systems includes a cylindrical lens so as to form the image of said light source, whose longitudinal length is longer than a width of said photoelectric transducer, onto said photoelectric transducer.

3. An automobile radar apparatus as claimed in claim 1, wherein the light projected from the light source means provided on the preceding vehicle has a light/dark pattern in the horizontal direction, and functions as an identification code of the preceding vehicle.

4. An automobile radar apparatus as claimed in claim 1, wherein the light projected from said light source means of the preceding vehicle corresponds to pulse modulated light containing an identification code of the preceding vehicle.

5. An automobile radar apparatus as claimed in claim 1, wherein said light source means provided with the preceding vehicle is arranged by a plurality of light sources positioned in a vertical direction, whereby even when a relative vertical position between the preceding vehicle and tracking vehicle is varied, images of said light sources can be formed on said photoelectric transducer.

6. An automobile radar apparatus as claimed in claim 1, wherein an optical position detector (PSD) is employed as said photoelectric transducer.

7. An automobile radar apparatus as claimed in claim 1, wherein a CCD is employed as said photoelectric transducer.

8. An automobile radar apparatus in claimed in claim 1, wherein a photodiode array is employed as said photoelectric transducer.

9. An automobile radar apparatus as claimed in claim 1, wherein said light-receiving optical systems includes a visible light cut filter.

10. An automobile radar apparatus as claimed in claim 4, further comprising optical system rotating control means which rotates each of said light-receiving optical systems upon supplying a control signal to said rotating means such that an output from said photoelectric transducer is input to said rotating control means and this output is made equal to a predetermined value, and which neglects an output newly obtained from said photoelectric transducer during a predetermined time period after said photoelectric transducer receives said light source image, or after the signal input to said rotating means is output.

11. An automobile radar apparatus as claimed in claims 1 or 4, further comprising instruction means for instructing a tracking control to drive the tracking vehicle while maintaining a predetermined safety distance apart from the preceding vehicle, and;
   a returning means for rotatably returning said light-receiving system to a predetermined reference position before the tracking control is commenced in response to the instruction derived from said instruction means.

* * * * *